G. F. W. KALB & C. BERNER.
APPARATUS FOR INDICATING AND RECORDING THE SPEED OF POWER DRIVEN VEHICLES.
APPLICATION FILED NOV. 4, 1912.
1,181,897.
Patented May 2, 1916.
3 SHEETS—SHEET 2.
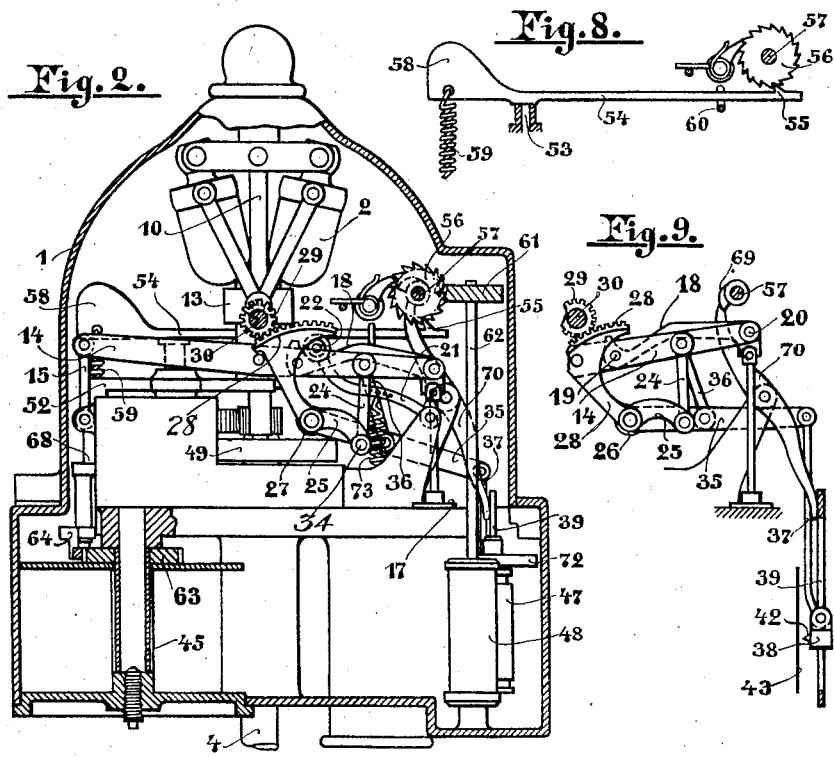
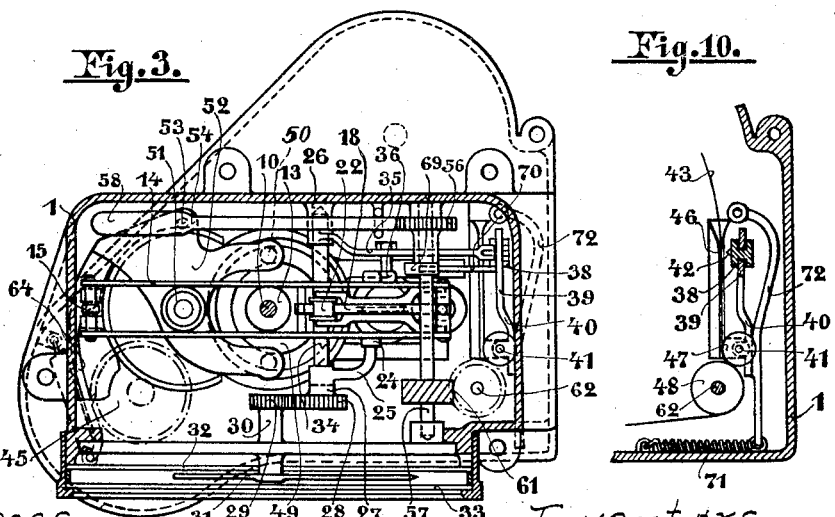

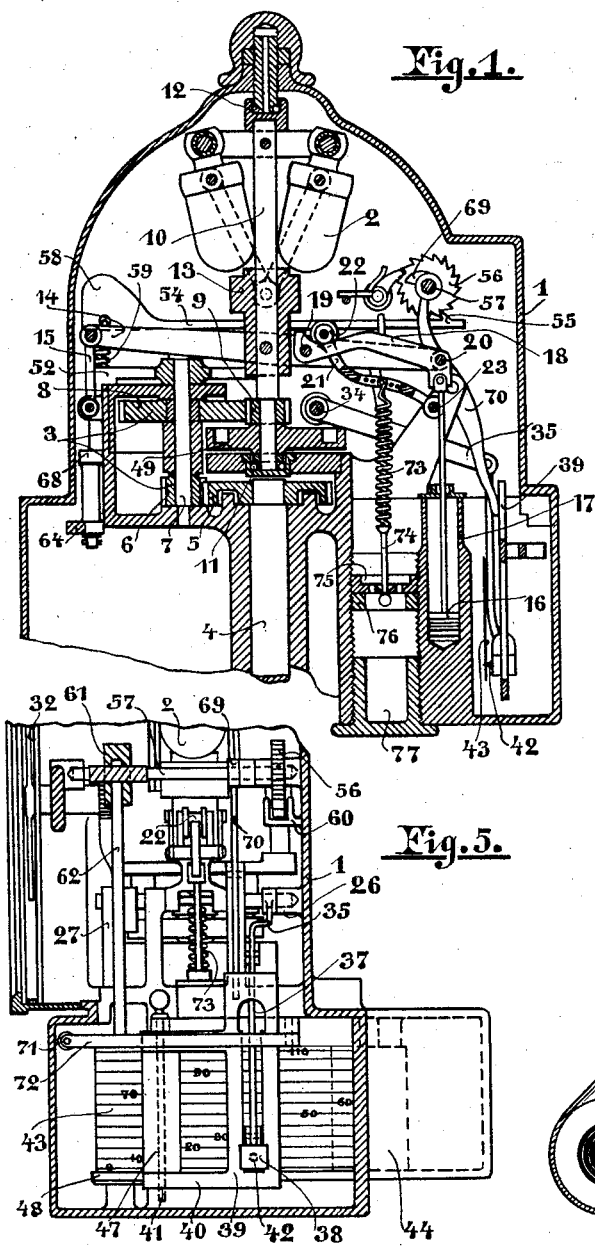

G. F. W. KALB & C. BERNER.
APPARATUS FOR INDICATING AND RECORDING THE SPEED OF POWER DRIVEN VEHICLES.
APPLICATION FILED NOV. 4, 1912.
1,181,897.
Patented May 2, 1916.
3 SHEETS—SHEET 3.
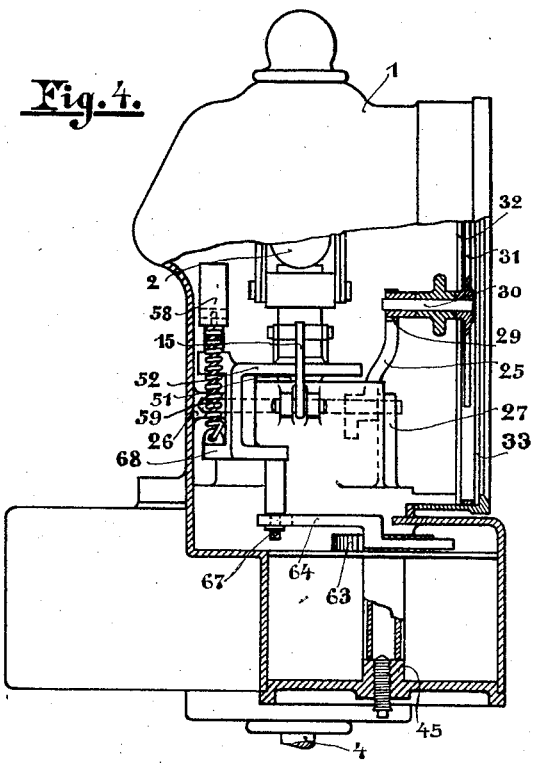
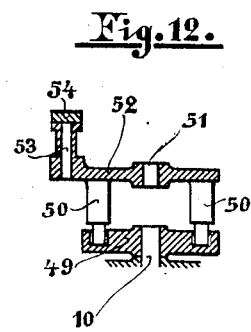
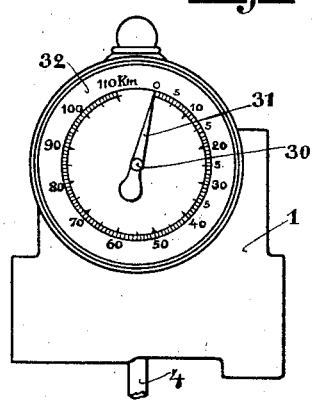
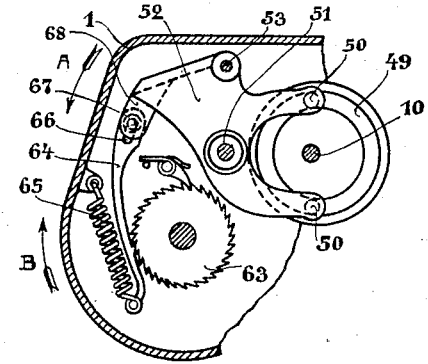

UNITED STATES PATENT OFFICE.

GEORG FREDRIK WILHELM KALB AND CHRISTIAN BERNER, OF GOTTENBORG, SWEDEN.

APPARATUS FOR INDICATING AND RECORDING THE SPEED OF POWER-DRIVEN VEHICLES.

1,181,897.      Specification of Letters Patent.      Patented May 2, 1916.

Application filed November 4, 1912. Serial No. 729,483.

*To all whom it may concern:*

Be it known that we, GEORG FREDRIK WILHELM KALB and CHRISTIAN BERNER, citizens of Sweden, residing at Gottenborg, in the province of Gottenborg and Bohus and Kingdom of Sweden, have invented new and useful Improvements in Apparatus for Indicating and Recording the Speed of Power-Driven Vehicles, of which the following is a specification.

Our invention relates to recorders or apparatus for indicating and recording the speed and the distance traveled by locomotives, motor cars, electric tram cars or other power-driven vehicles, and it has for its object to provide means for accurately indicating the speed and distance traveled, notwithstanding the jolting and vibration of the vehicle and irregularities in the working parts of the driving mechanism of the vehicle.

Another object is to provide means for easy and exact adjustment of the measuring apparatus when new, as well as after wear has taken place.

Another object is to provide a speed measuring apparatus adapted to be fully adjusted for use in connection with a certain vehicle before delivery from the manufacturer without liability of the adjustment being affected by shipment to the place where the apparatus is to be used.

The invention will be fully understood from the following description and claims when the same are read in connection with the accompanying drawings, in which:

Figure 1 is a vertical section of the meter. Fig. 2 is a view taken in a plane parallel to that of Fig. 1. Fig. 3 is a horizontal section. Fig. 4 is a sectional view, partly in elevation, taken at a right angle to Figs. 1 and 2. Fig. 5 is a detail section taken in a plane parallel to that of Fig. 4, and looking from the rear end. Fig. 6 is a reduced elevation of the apparatus. Fig. 7 is a detail horizontal section taken in a plane below that of Fig. 3. Fig. 8 is a view of the mechanism for feeding the recording paper strip as well as for producing the indentations on said strip. Fig. 9 is a detail elevation showing the motion-transmitting members. Fig. 10 is a detail horizontal section taken through the indentation mechanism. Fig. 11 is a detail horizontal section showing the main feeding device for the recording paper strip. Fig. 12 is a detail section of the members for transmitting motion to the feeding and recording devices.

Similar numerals designate corresponding parts in all of the views.

A metal shell 1 incloses the moving and recording parts. A centrifugal pendulum governor 2 in the shell 1 is driven from one of the moving parts of the vehicle, for instance from the driving wheel shaft. The drive-shaft through suitable means (not shown) rotates a shaft 4, and the latter drives the governor shaft 10 through a gear 5 fast on the shaft 4, a shaft 7, a gear 6 fast on the shaft 7 and intermeshed with the gear 5, a gear 9 fast on the shaft 10, and a gear 3 fast on the shaft 7 and intermeshed with the gear 9. The sleeve 13 of the governor actuates a pair of levers 14 pivoted at one end to a link 15 and connected at their opposite ends to a piston 16, movable up and down in a cylinder 17 filled with some suitable liquid. The levers 14 are provided with a curved rail 18 which is attached to the levers by bolts 19, 20 in order to be easily removed for adjustment when required. On the rail 18 rests one end of a lever 21 pivoted at 23 and connected to a retractile spring 73. To decrease the friction between the rail 18 and the lever 21 the latter is provided with a roller 22 movable along the rail. The levers 14 are further provided with a link 24, connected to one arm of a bell crank lever 25, pivoted in bearings 26, 27 in the shell 1. The rear arm of said lever 25 is provided with a toothed sector 28 that actuates a pinion 29 on a shaft 30 which is provided with a pointer 31 movable in front of a dial 32. The dial is protected from injury by a glass 32×.

On the shaft 34 of the bell crank lever 25 is fixedly mounted a lever 35, Fig. 9. From the lever 35 a link transmits up and down motion to a block 38 movable in a straight guide 39, having arms 40, hinged on a vertical shaft 41 in such a manner as to be capable of a slight swinging motion like a door. To permit this swinging motion of the straight guide without binding, the block 38 must be somewhat loose in the guide. On the block a punch 42 is directed toward a recording paper strip 43 in such manner that the punch produces marks in paper strip 43 when the guide 39 is thrown toward the said strip, which latter is usually provided with parallel lines to indicate different speeds, in accordance with the graduations on the dial 32. The paper strip is wound off a drum 44 and on to another drum 45, and is guided in front of the punch 42 by a slide 46 and guide rollers 47, 48. The motion of the paper strip is produced in the following manner: On the governor shaft 10 is fixed a disk 49 having an eccentric groove which engages pins 50 on a lever 52 pivoted at 51. The lever 52 is connected through a bolt 53 with a horizontal lever 54, having a pawl 55 engaged with a ratchet wheel 56 on a shaft 57, Fig. 8. The rear end of the lever 54 is loaded by a counter weight 58 as well as a spiral spring 59 and the lever is guided by a fork 60. The shaft 57 transmits a step by step motion through a cross-pinion gear 61 to a vertical shaft 62 on the guide roll 48, causing said roll to revolve. This revolving of the roll 48 serves, however, merely as a protection against wearing of the paper strip in the corner, and the proper forward feeding motion is produced by revolving the drum 45, which is connected to a ratchet wheel 63, Fig. 11, actuated by a pawl 64, connected to a spiral spring 65 so arranged that the pawl tends to rotate the ratchet wheel 63. The rear end of the pawl 64 is connected to an arm 68 on the lever 52 by means of a bolt 67 movable in a slot 66 in the pawl. The rocking motion of the lever 52 thus operates to push the pawl idly over the teeth of the ratchet wheel 63 while the spring 65 actuates the pawl to rotate said wheel.

On the shaft 57 there is fixed a cam disk 69 for actuating a lever 70 the rear end of which touches the side of the guide 39. When the cam disk 69 revolves with the shaft 57 the end of the lever 70 is moved laterally by the cam, with the result that the lever causes the guide plate 39 with the block 38 to move in a direction away from the paper strip 43 until the cam releases the end of the lever 70. Against the opposite side of the guide 39 a lever 72 is pressed by a spring 71 in such a manner that, when the lever 70 clears or is released by the cam of the disk 69, the spring 71 pulls the lever 72 back and thus causes the guide 39 with the block 38 to be forced back toward the paper strip, with the result that the punch 42 strikes the paper strip and produces a mark therein. This back-motion of the guide plate with the block is a very fast one.

The recorder works as follows: When the governor shaft 10 revolves, the sleeve 13 ascends to a degree corresponding to the actual number of revolutions. The levers 14 are swung upwardly by the upward movement of the sleeve 13, thereby causing the lever 21 to be swung upwardly so that its roller end moves outwardly along the rail 18.

In the practical use of the recorder, the balls 2 normally hang close to the shaft 10. When, however, the governor commences to revolve, the balls fly out and raise the sleeve 13. From this it follows that if a uniform throw is desired the checking power on the sleeve 13 must be increased in proportion to the distance the balls move away from the shaft 10 but only to a certain point. Beyond such point contrary conditions will be observed and hence the checking power on the sleeve should be diminished incidental to the movement of the balls outwardly beyond the point or points referred to. In this connection it will be observed by reference to Figs. 1 and 2 that the upper edge of the rail 18 is inclined upwardly from a point adjacent to the left hand end of the rail to an intermediate point in the length thereof, and is then inclined downwardly from said point to the right hand end of the rail. Because of this the stretching of the spring 73 and consequently the checking power thereof are increased during the first portion of the outward movement of the balls 2, and then as the balls 2 move outwardly beyond the points before mentioned the stretching of the spring 73 and the checking power thereof will be diminished in proportion to said movement of the balls.

The spring 73 is connected to a rod 74, having a ball-shaped head, disposed under a nut 75, below which is a jam nut 76. The entrance to the nuts is closed by a screw cap 77. Thus the load on the lever 21 may be changed when desired.

In order to prevent a too great throw of the sleeve 13, the cylinder 17 is filled with some suitable liquid, adapted to pass slowly between the cylinder wall and the piston.

Movement of the levers 14 will be attended by movement of the lever 25 and the pointer 31. Simultaneously the grooved disk 49 causes the lever 52 to swing, and thus rocking motion will be transmitted to the ratchet mechanism 64, 63 as well as to the ratchet mechanism 54, 55, 56 so that the wheels 63 and 56 will be rotated step by step. The ratchet wheel 63 will cause the drum 45 to revolve and the paper strip 43 to move off the drum 44 and on the drum 45. This motion of the paper strip will be assisted by the revolving of the corner roller 48. Should anything interfere with the free motion of the paper strip 45, the spring 65 will not be able to pull back the pawl 64 and hence the wheel 63 will be stopped. The lever 52, however, will continue to swing and the connecting bolt 67 between the lever 52 and the pawl 64 will then move freely in the slot 66. The throw of the governor's sleeve 13 through the mechanism described causes the block 38 to rise or fall in the guide 39 in such a manner that the punch 42 is always in front of the line on the paper strip 43 which corresponds to the actual speed of the vehicle. During each revolution of the shaft 57 the upper end of the lever 70 will be pushed away by the cam on the disk 69 with the result that the lower end of the lever moves the guide 39 away from the paper strip 43 until the cam releases the lever. Then the spring 71 through the lever 72 quickly throws the guide back in its former position and causes the punch 42 to strike the paper strip 42 so as to produce therein a mark in the height of the line which corresponds to the speed at the time.

When desired the recorder may be manufactured without the recording devices, and without departure from the scope of our claimed invention.

We claim:

1. Apparatus for measuring and recording the speed of power-driven vehicles, comprising a centrifugal pendulum governor driven off the vehicle, a lever 14 actuated by the sleeve of said governor, means for operating a pointer off said lever and means for checking the deflection of the governor, consisting in a curved rail 13 on the lever 14, and a spring or weight loaded lever 21 resting against the rail and slidable along the same as and for the purpose described.

2. Apparatus for measuring and recording the speed of power-driven vehicles, comprising a centrifugal pendulum governor, driven off the vehicle, a lever 14 operated by the sleeve of the governor, a curved rail on said lever actuated by a lever 21 resting against and slidable along said rail, and means securing said rail in a detachable manner to the lever for the purpose set forth.

In testimony whereof we have hereunto set our hands in presence of two subscribing witnesses.

GEORG FREDRIK WILHELM KALB.
CHRISTIAN BERNER.

Witnesses:
   EDW. T. HOLMGREN,
   ERIC MIDHOLM.

Copies of this patent may be obtained for five cents each, by addressing the "Commissioner of Patents, Washington, D. C."